US012116816B2

(12) United States Patent
Xu

(10) Patent No.: US 12,116,816 B2
(45) Date of Patent: Oct. 15, 2024

(54) SYNCHRONOUS SLIDING MECHANISM, SIDE HIDDEN DOOR SYSTEM, AND CABINET BODY WITH SIDE HIDDEN DOOR SYSTEM

(71) Applicant: Guangdong OPK Smart Home Technology Co., Ltd., Guangdong (CN)

(72) Inventor: Jiangde Xu, Guangdong (CN)

(73) Assignee: Guangdong OPK Smart Home Technology Co., Ltd., Zhongshan (CN)

( * ) Notice: Subject to any disclaimer, the term of this patent is extended or adjusted under 35 U.S.C. 154(b) by 113 days.

(21) Appl. No.: 18/060,575

(22) Filed: Dec. 1, 2022

(65) Prior Publication Data

US 2023/0105211 A1 Apr. 6, 2023

Related U.S. Application Data

(63) Continuation of application No. PCT/CN2020/103729, filed on Jul. 23, 2020.

(30) Foreign Application Priority Data

Jun. 15, 2020 (CN) ......................... 202010544080.2

(51) Int. Cl.
*E05D 15/58* (2006.01)
*E05D 15/44* (2006.01)
(Continued)

(52) U.S. Cl.
CPC ............. *E05D 15/44* (2013.01); *E05D 15/58* (2013.01); *E05D 15/581* (2013.01);
(Continued)

(58) Field of Classification Search
CPC .............. E05D 15/14; E05D 15/44581; E05D 15/0686; E05D 15/58; E06B 3/4663;
(Continued)

(56) References Cited

U.S. PATENT DOCUMENTS 511,804 A * 1/1894 Schmohl ................ E05D 15/14
16/92
3,456,995 A * 7/1969 Nyquist ................ E06B 3/5045
312/331

(Continued)

FOREIGN PATENT DOCUMENTS

CN 207485245 U 6/2018
DE 102004037592 A1 * 3/2006 ............ E05D 15/44

OTHER PUBLICATIONS

International Search Report of PCT Patent Application No. PCT/CN2020/103729 issued on Mar. 11, 2021.

(Continued)

*Primary Examiner* — Kimberley S Wright

(57) ABSTRACT

The invention discloses a synchronous sliding mechanism, a side hidden door system, and a cabinet body with the side hidden door system. The synchronous sliding mechanism comprises a guide rail and a first connecting rod mechanism, wherein the first connecting rod mechanism comprises two sliding ends provided on the guide rail; and when the guide rail reciprocates in a horizontal axial direction, the two sliding ends are close to or far away from each other. Through connection between connecting rods and the guide rail, the guide rail may reciprocate stably and synchronously. The synchronous sliding mechanism is widely suitable for furniture such as door bodies, cabinet bodies and the like, and has an excellent effect.

16 Claims, 10 Drawing Sheets

(51) Int. Cl.

| | |
|---|---|
| ***E06B 3/46*** | (2006.01) |
| ***E06B 3/50*** | (2006.01) |
| ***E06B 5/00*** | (2006.01) |
| *E05D 15/06* | (2006.01) |

(52) U.S. Cl.
CPC .......... *E06B 3/4663* (2013.01); *E06B 3/5072* (2013.01); *E06B 3/509* (2013.01); *E06B 5/006* (2013.01); *E05D 15/0686* (2013.01); *E05Y 2201/624* (2013.01); *E05Y 2201/684* (2013.01); *E05Y 2800/102* (2013.01); *E05Y 2900/212* (2013.01)

(58) Field of Classification Search
CPC ........ E06B 3/5072; E06B 3/509; E06B 5/006; E06B 3/5045; E05Y 2201/624; E05Y 2201/684; E05Y 2800/102; E05Y 2900/212; E05Y 2900/20
See application file for complete search history.

(56) References Cited

U.S. PATENT DOCUMENTS

| | | | | |
|---|---|---|---|---|
| 5,149,180 | A | 9/1992 | Haab et al. | |
| 9,894,996 | B1 | 2/2018 | Grela et al. | |
| 2010/0270898 | A1 * | 10/2010 | Haab ....................... | E05D 15/58 312/323 |

OTHER PUBLICATIONS

Extended European Search Report of Counterpart European Patent Application No. 20940876.4 issued on Oct. 19, 2022.

* cited by examiner

SYNCHRONOUS SLIDING MECHANISM, SIDE HIDDEN DOOR SYSTEM, AND CABINET BODY WITH SIDE HIDDEN DOOR SYSTEM

CROSS REFERENCE TO RELATED APPLICATIONS

The present application is a Continuation Application of PCT Application No. PCT/CN2020/103729 filed on Jul. 23, 2020, which claims the benefit of Chinese Patent Application No. 202010544080.2 filed on Jun. 15, 2020. All the above are hereby incorporated by reference in their entirety.

FIELD OF THE INVENTION

The present invention relates to a door body telescopic mechanism in the furniture industry, and more particularly relates to a synchronous sliding mechanism, a side hidden door system, and a cabinet body with the side hidden door system. Through the synchronous sliding mechanism, telescopic, storage and hiding functions of a door body may be easily realized.

BACKGROUND OF THE INVENTION

In the current side hung doors, sliding doors, folding doors and the like, a door plate and a door body are generally connected by hinges. When the door plate is opened and closed, the door plate is always outside the door body, occupying a large space and bringing a lot of inconvenience to life.

U.S. Pat. No. 5,149,180A discloses a kind of furniture capable of accommodating a door plate, which mainly realizes the function of moving the door plate in and out through a scissors-shaped assembly. The scissors-shaped assembly comprises two cross beams connected in a hinged manner. Upper ends of the two cross beams may be pivotally fixed on a cavity, and lower ends of the two cross beams are provided in a frame and may move pivotally and vertically. When the door plate moves in the cavity, the upper ends of the two cross beams are maintained at the same height, and the lower ends may move vertically.

Although the above scissors-shaped assembly may realize the moving in and out of the door plate, the two hinged cross beams are prone to problems of asynchronous sliding, and because the upper ends of the cross beams are at the same height, the required mounting accuracy is relatively high.

SUMMARY OF INVENTION

An objective of the present invention is to provide a synchronous sliding mechanism, a side hidden door system, and a cabinet body with the side hidden door system. Through the synchronous sliding mechanism, a door body may be telescopic, and may be stored and hidden synchronously and stably, thereby effectively reducing the occupied space of the door body.

In an aspect, the present invention provides a synchronous sliding mechanism for a movement guide of a side door. The synchronous sliding mechanism comprises a guide rail and a first connecting rod mechanism, the first connecting rod mechanism comprises two sliding ends provided on the guide rail; and when the guide rail reciprocates in a horizontal axial direction, the two sliding ends are close to or far away from each other.

Preferably, the first connecting rod mechanism comprises a fixed base, a first connecting rod and a second connecting rod; ends of the first connecting rod and the second connecting rod on a same side are pivotally connected to the fixed base; the first connecting rod and the second connecting rod are located on two sides of a horizontal central axis of the fixed base; and the two sliding ends are provided on other ends of the first connecting rod and the second connecting rod respectively.

Preferably, the first connecting rod and the second connecting rod are symmetrically provided in a horizontal central axial direction of the fixed base.

Preferably, the first connecting rod and the second connecting rod are pivotally connected to the fixed base through a same pivotal connection piece.

Preferably, the first connecting rod and the second connecting rod are pivotally connected to the fixed base.

Preferably, the synchronous sliding mechanism further comprises a second connecting rod mechanism, the second connecting rod mechanism comprises a sliding base, and a third connecting rod and a fourth connecting rod are symmetrically provided in the horizontal central axial direction of the fixed base; the sliding base and the fixed seat are located on a same side of the guide rail; and ends of the third connecting rod and the fourth connecting rod on a same side are pivotally connected to the sliding base, and other ends are pivotally connected to the first connecting rod and the connecting rod respectively.

Preferably, the synchronous sliding mechanism further comprises a horizontal shaft, wherein one end of the horizontal shaft is fixed on the fixed base and another end is in slidingly matched with the sliding base.

Preferably, the horizontal shaft is provided with a sliding groove; the sliding base is provided with a sliding piece; and the sliding base slides in the sliding groove of the horizontal shaft.

Preferably, the sliding piece is a pulley.

Preferably, the third connecting rod and the fourth connecting rod are respectively provided with bending portions, and the bending portions enable respective rod bodies of the third connecting rod and the fourth connecting rod to be positioned in different planes in a depth direction.

Preferably, the bending portions divide the respective rod bodies of the third connecting rod and the fourth connecting rod into front rod portions and rear rod portions; the front rod portions of the third connecting rod and the fourth connecting rod are pivotally connected to the first connecting rod and the second connecting rod respectively; the rear rod portions of the third connecting rod and the fourth connecting rod are pivotally connected to the sliding base respectively; and the front rod portions are located on inner sides of the rear rod portions in the depth direction.

Preferably, the front rod portions and the rear rod portions are parallel with each other.

In a second aspect, the present invention provides a side hidden door system, including a door plate and the above synchronous sliding mechanism, wherein the door plate is hinged with the guide rail.

In a third aspect, the present invention provides a cabinet body, including a side hidden door system. The synchronous sliding mechanism is provided on a side of the cabinet body.

Preferably, the cabinet body comprises a side panel, the fixed base of the synchronous sliding mechanism is fixed on the side panel, and the synchronous sliding mechanism is located in the cabinet body.

Preferably, the cabinet body comprises a built-in plate, an accommodating cavity is formed between the built-in plate and the side panel closer to the built-in plate, and the synchronous sliding mechanism is located in the accommodating cavity.

Preferably, the fixed base of the synchronous sliding mechanism is fixed on the side panel.

Preferably, the fixed base of the synchronous sliding mechanism is fixed on the built-in plate.

Preferably, upper and lower sliding rails are provided in the cabinet body, sliding pieces are provided at two ends of the guide rail, and the guide rail is slidingly connected with the upper and lower sliding rails through the sliding pieces at the two ends.

The present invention has the following beneficial effects: a stable quadrilateral symmetrical in the horizontal axial direction is formed between the first connecting rod mechanism and the second connecting rod mechanism; when the two sliding ends of the first connecting rod mechanism slide up and down in the guide rail, a pivotal movement of the second connecting rod mechanism is driven, so that the second connecting rod mechanism reciprocates in a direction of the horizontal shaft; and the combination of the first connecting rod mechanism and the second connecting rod mechanism improves the overall stability and synchronization. The present invention has a stable structure and excellent synchronization performance, is suitable for hidden door furniture, and has broad market prospects.

BRIEF DESCRIPTION OF THE DRAWINGS

To illustrate the technical solutions in embodiments of the present application more clearly, the accompanying drawings for describing the embodiments are introduced briefly below. Obviously, the drawings in the following description are only some embodiments of the present application, and for those of ordinary skill in the art, other drawings may also be obtained from these accompanying drawings without creative efforts.

Figure 1:
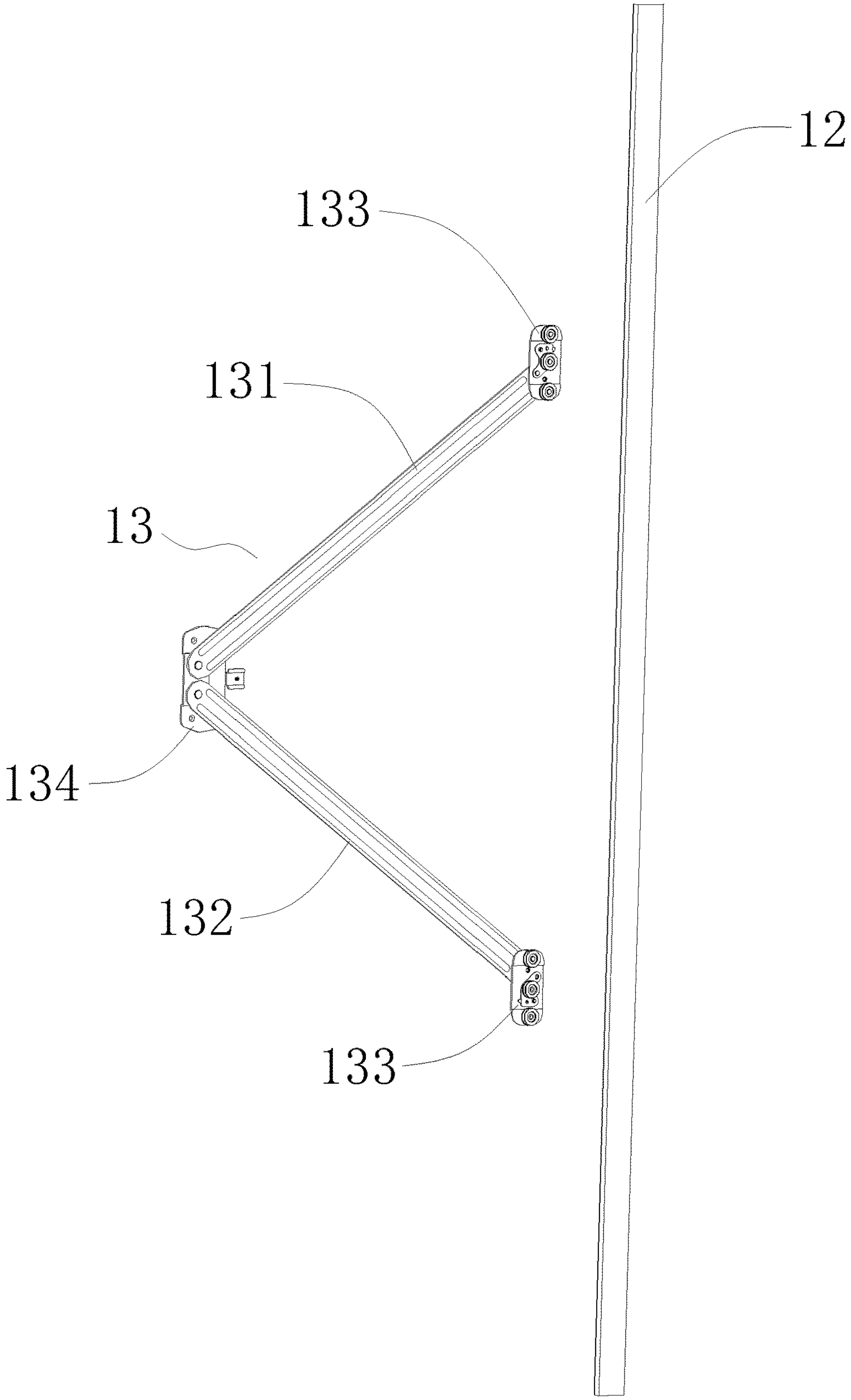
FIG. 1 is a diagram of assembly of a synchronous sliding mechanism shown in an embodiment 1 of the present invention.

In the drawings: synchronous sliding mechanism 1, horizontal shaft 11, sliding groove 111, guide rail 12, first connecting rod mechanism 13, first connecting rod 131, second connecting rod 132, sliding end 133, fixed base 134, second connecting rod mechanism 14, sliding base 141, bending portion 142, third connecting rod 143, fourth connecting rod 144, front rod portion 145, rear rod portion 146, side hidden door system 2, door plate 21, cabinet body 3, side panel 31, built-in plate 32, accommodating cavity 33, upper sliding rail 34, lower sliding rail 35.

DETAILED DESCRIPTION OF ILLUSTRATED EMBODIMENTS

For better understanding and implementation, the technical solutions in the embodiments of the present invention will be described clearly and completely in combination with the accompanying drawings in the embodiments of the present invention.

In the description of the present invention, it should be noted that orientation or position relationships indicated by terms “upper”, “lower”, “front”, “rear”, “left”, “right”, “vertical”, “horizontal”, “top”, “bottom”, “inside”, “outside” and the like refer to orientations or position relationships shown in the accompanying drawings, and these terms are merely for facilitating description of the present invention and simplifying the description, but not for indicating or implying that the mentioned device or elements must have a specific orientation and must be established and operated in a specific orientation, and thus, these terms should not be understood as a limitation to the present invention.

Unless otherwise defined, all technical and scientific terms used herein have the same meaning as those commonly understood by those skilled in the art of the present invention. The terms used in the specification of the present invention are merely for the purpose of describing specific embodiments, and is not intended to limit the present invention.

Embodiment 1

The present invention discloses a synchronous sliding mechanism 1, as shown in FIG. 1, FIG. 2, FIG. 3 and FIG. 4. The synchronous sliding mechanism 1 comprises a guide rail 12 and a first connecting rod mechanism 13, wherein the first connecting rod mechanism 13 comprises a fixed base 134, and a first connecting rod 131 and a second connecting rod 132 which are symmetrical in a horizontal central axial direction of the fixed base 134; ends of the first connecting rod 131 and the second connecting rod 132 on a same side are pivotally connected to the fixed base 134; sliding ends 133 corresponding to the guide rail 12 are provided at the other ends of the first connecting rod 131 and the second connecting rod 132; and when the guide rail 12 reciprocates in a horizontal axial direction, the sliding ends 133 of the first connecting rod 131 and the second connecting rod 132 are close to or far away from each other.

Preferably, the first connecting rod 131 and the second connecting rod 132 are pivotally connected to the fixed base 134 through a pivotal connection piece or pivotally connected to the fixed base 134 respectively. In the embodiment, the first connecting rod 131 and the second connecting rod 132 are pivotally connected to the fixed base 134 respectively. In this way, when the guide rail 12 is far away from the fixed base 134, the sliding ends 133 of the first connecting rod 131 and the second connecting rod 132 in the guide rail 12 are gradually close to each other; and when the guide rail 12 is close to the fixed base 134, the sliding ends 133 of the first connecting rod 131 and the second connecting rod 132 in the guide rail 12 are gradually away from each other. Due to the symmetrical design of the first connecting rod

131 and the second connecting rod 132, the sliding ends 133 move in the guide rail more synchronously.

Embodiment 2

Figure 2:
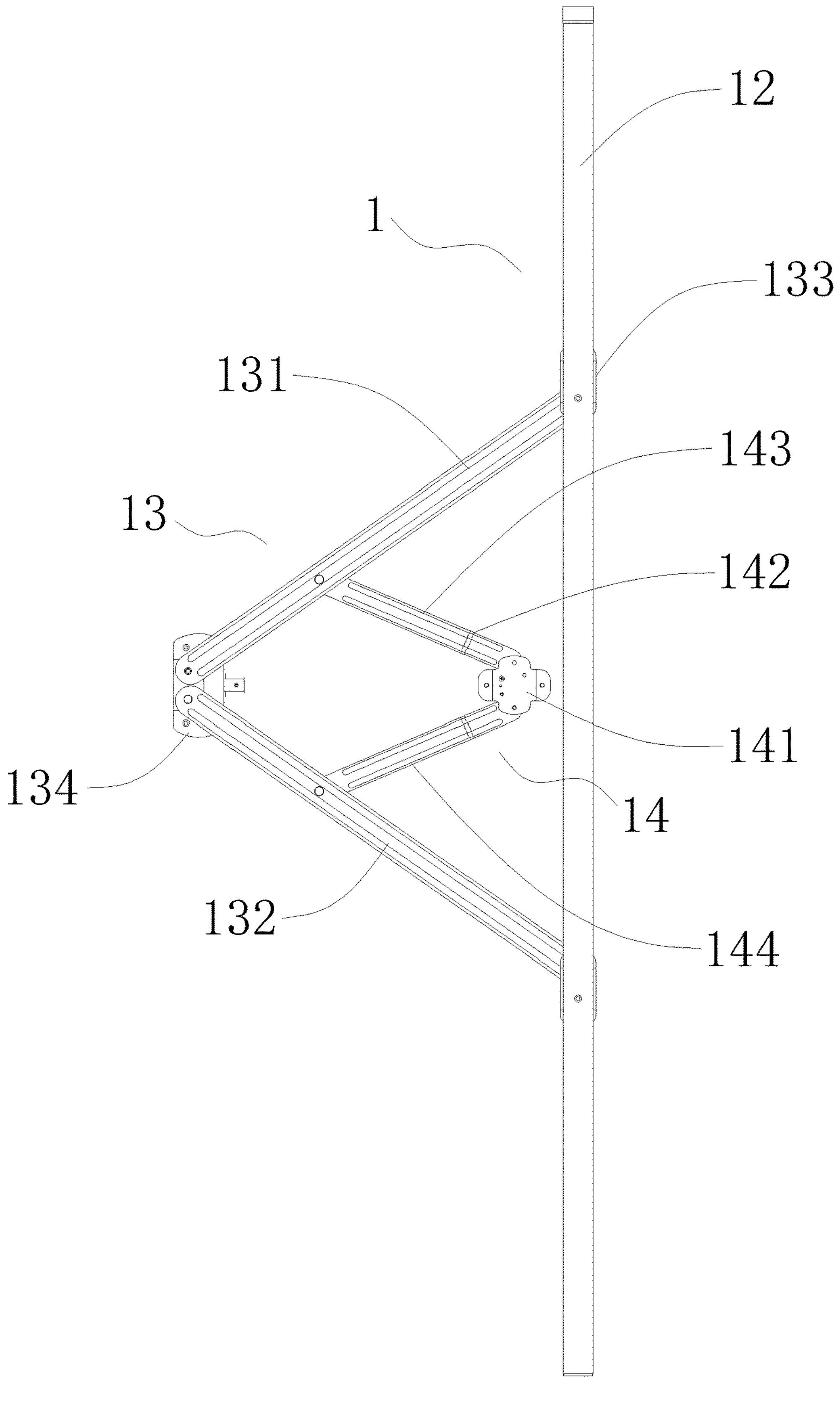
FIG. 2 is a structural diagram of a synchronous sliding mechanism shown in an embodiment 2 of the present invention from a viewing angle.

Based on the embodiment 1, the synchronous sliding mechanism 1 provided by the embodiment 2 is shown in FIG. 2 and further comprises a second connecting rod mechanism 14, wherein the second connecting rod mechanism 14 comprises a sliding base 141, and a third connecting rod 143 and a fourth connecting rod 144 which are symmetrically provided in the horizontal central axial direction of the fixed base 134; the sliding base 141 and the fixed base 134 are located on a same side of the guide rail 12; and ends of the third connecting rod 143 and the fourth connecting rod 144 on a same side are pivotally connected to the sliding base 141, and another end of the third connecting rod 143 is pivotally connected to the first connecting rod 131 and the other end of the fourth connecting rod 144 is pivotally connected to the second connecting rod 132.

Figure 3:
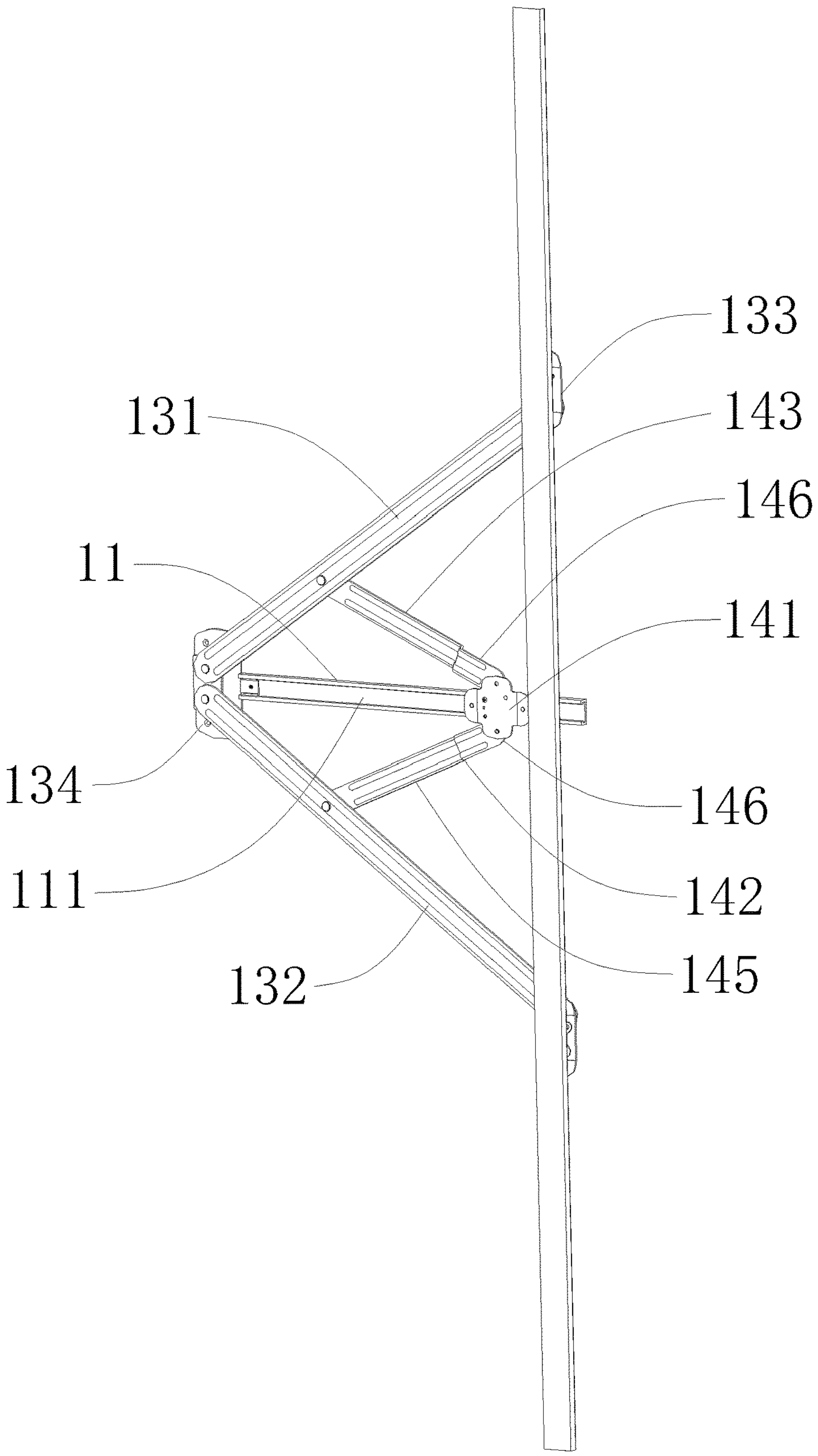
FIG. 3 is a structural diagram of the synchronous sliding mechanism shown in the embodiment 2 of the present invention from another viewing angle.
Figure 4:
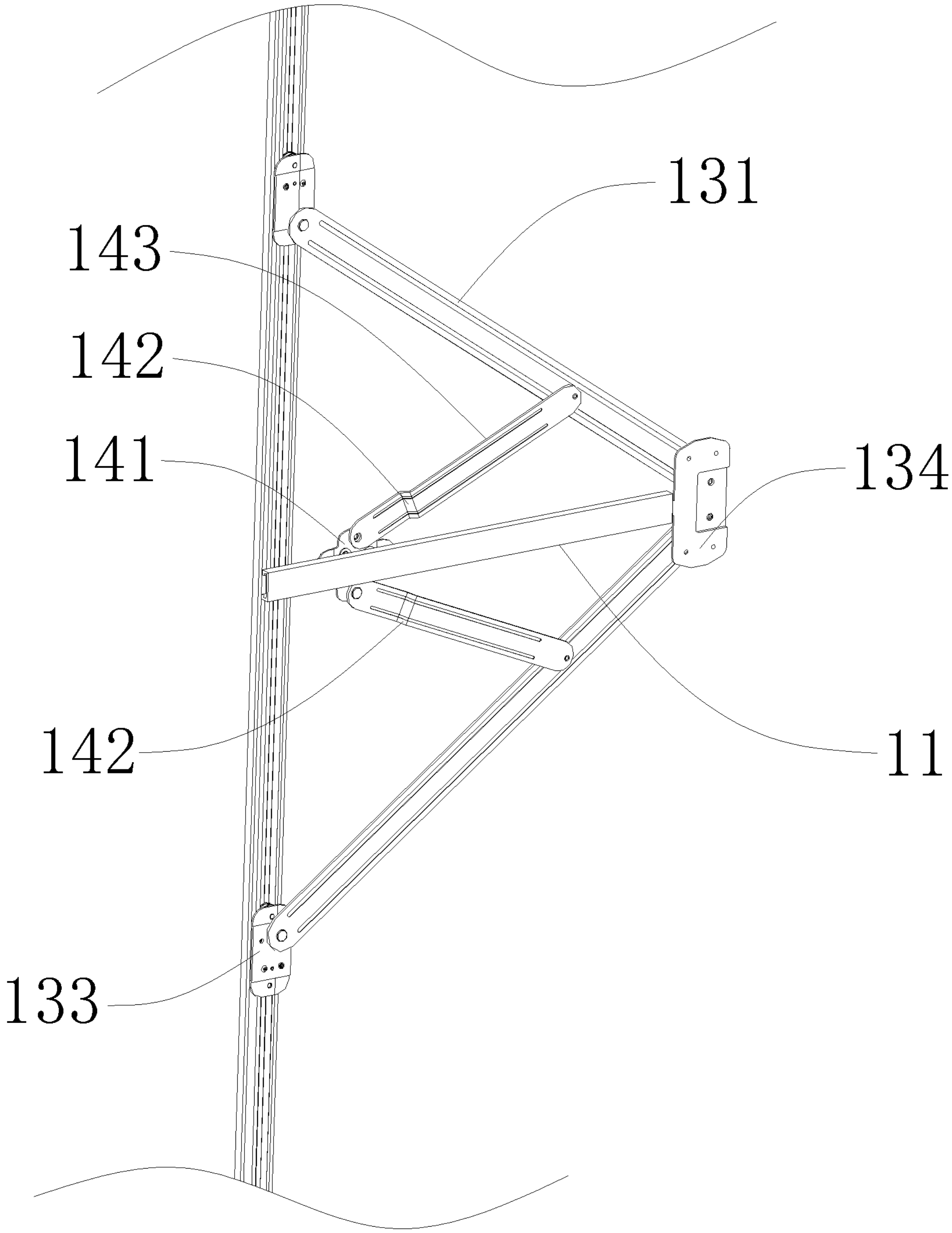
FIG. 4 is a diagram of a local portion of the synchronous sliding mechanism shown in the embodiment 2 of the present invention.

As shown in FIG. 3 and FIG. 4, the synchronous sliding mechanism 1 is further provided with a horizontal shaft 11 with a sliding groove 111 in a horizontal direction, one end of the horizontal shaft 11 is fixed on the fixed base 134 and the other end of the horizontal shaft 11 is slidingly matched with the sliding base 141, and the sliding base is provided with a sliding piece corresponding to the sliding groove 111. Preferably, the sliding piece used in the embodiment is a pulley, and the pulley cooperates with the sliding groove 111, so that the third connecting rod 143 and the fourth connecting rod 144 may slide smoothly along the horizontal shaft 11 in the horizontal direction. When the guide rail 12 moves, the sliding ends 133 of the first connecting rod 131 and the second connecting rod 132 slide along the guide rail 12 in a vertical direction, the third connecting rod 143 and the fourth connecting rod 144 slide along the horizontal shaft 11 in the horizontal direction, a quadrilateral structure formed by the first connecting rod mechanism 13 and the second connecting rod mechanism 14 enables the whole mechanism to operate smoothly and stably, and the multi-rod linkage of the first connecting rod 131, the second connecting rod 132, the third connecting rod 143 and the fourth connecting rod 144 enables the operation process of the whole mechanism to be more synchronous.

The third connecting rod 143 and the fourth connecting rod 144 are provided with bending portions 142. Taking the third connecting rod 143 as an example, the bending portion 142 divides the third connecting rod 143 into a front rod portion 145 and a rear rod portion 146 which are located in different planes. More preferably, the front rod portion 145 and the rear rod portion 146 of the third connecting rod 143 are parallel with each other, and the front rod portion 145 is located on an inner side of the rear rod portion 146 in a depth direction. Due to the presence of the bending portions 142, the third connecting rod 143 and the fourth connecting rod 144 are staggered in the depth direction. Meanwhile, rear parts of the third connecting rod 143 and the fourth connecting rod 144 are pivotally connected to the sliding base 141, so that the pulley on the sliding base 141 is more matched with the sliding groove 111 in the horizontal shaft 11. In the process that the sliding base 141 slides along the horizontal shaft 11, there is no deviation in the depth direction, and the sliding process is more stable.

Embodiment 3

Figure 5:
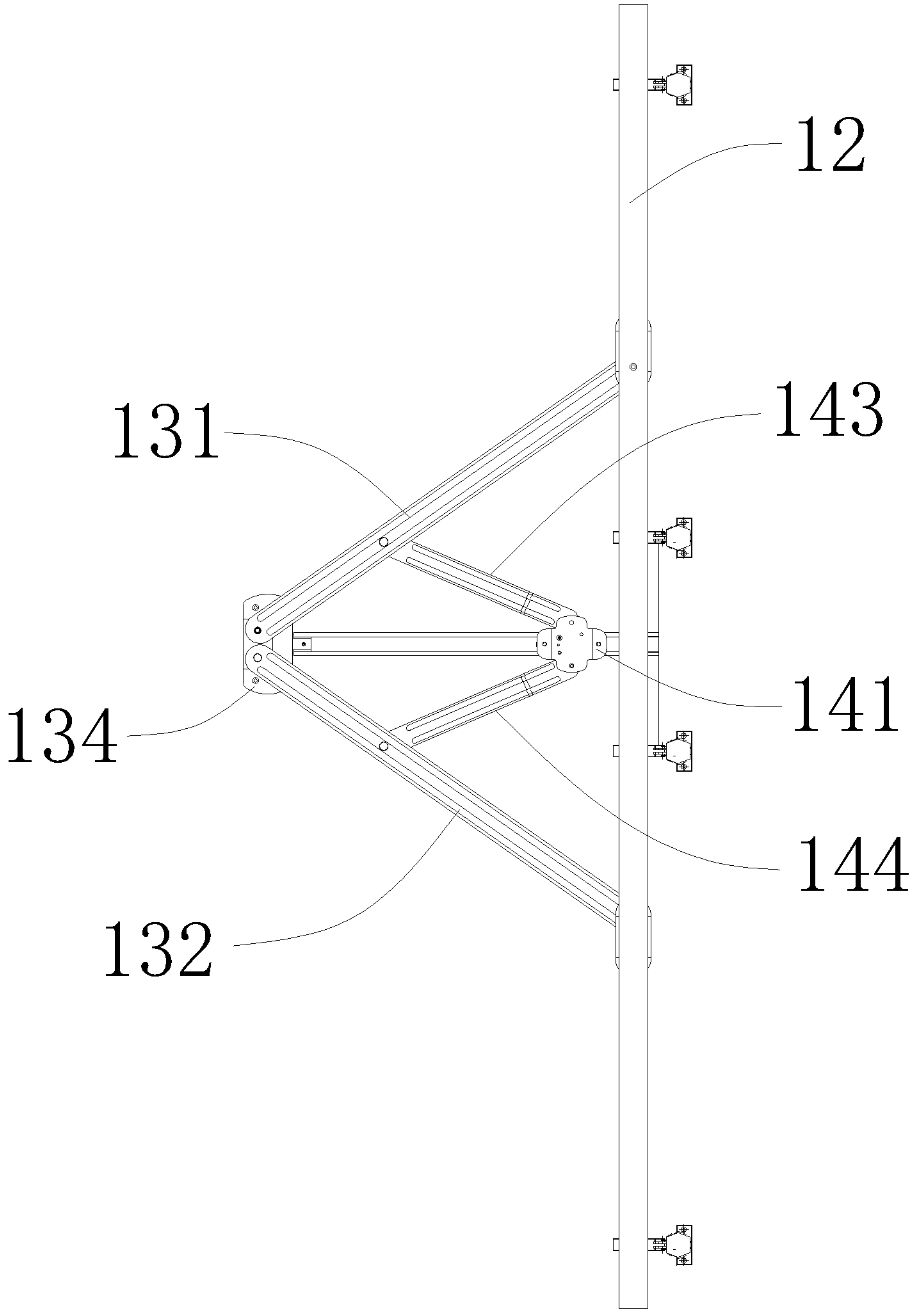
FIG. 5 is a structural diagram of a side hidden door system provided by an embodiment 3 of the present invention.
Figure 6:
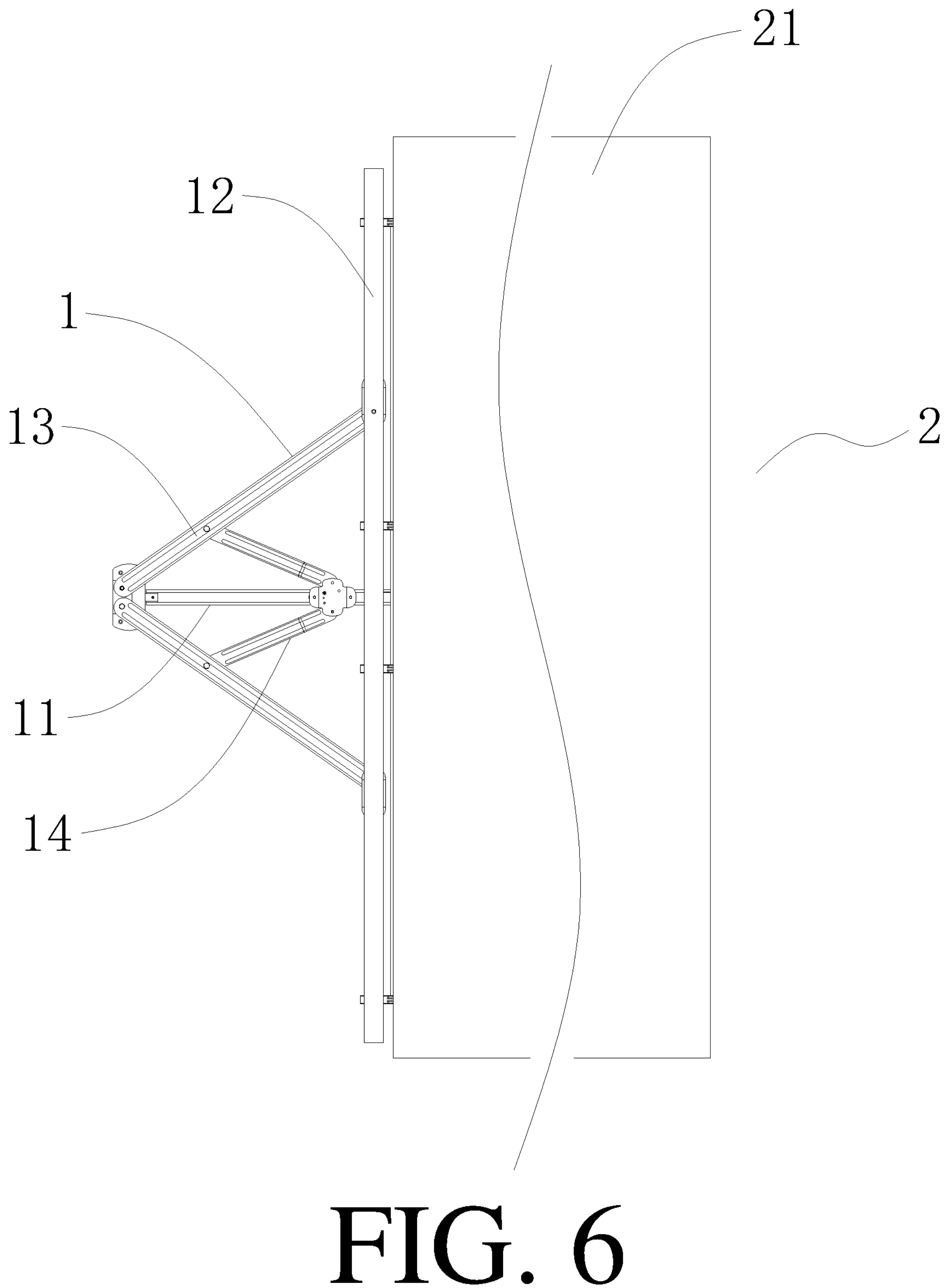
FIG. 6 is a diagram of assembly of the side hidden door system provided by the embodiment 3 of the present invention.
Figure 7:
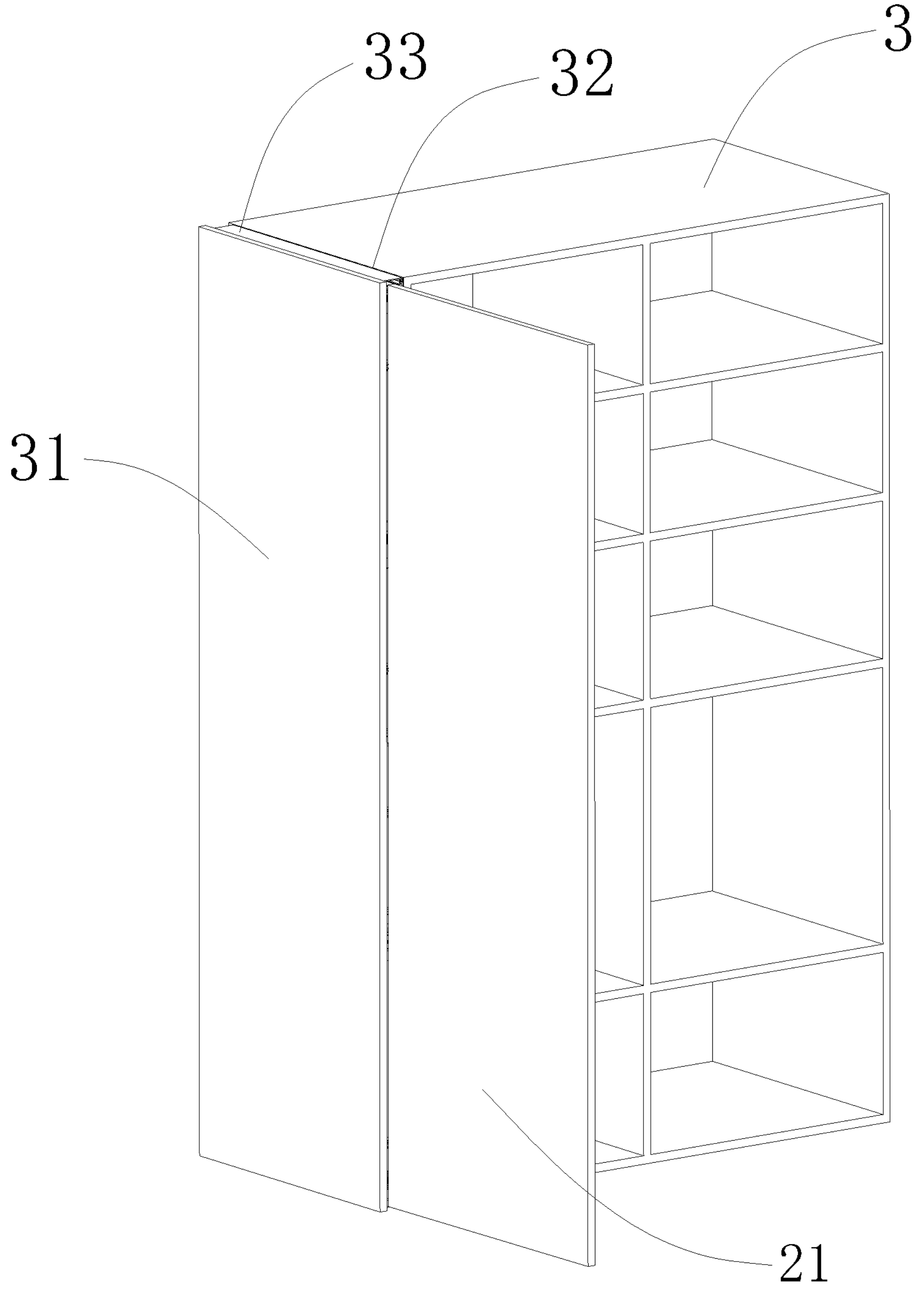
FIG. 7 is a left view of a cabinet body provided by an embodiment 4 of the present invention.
Figure 8:
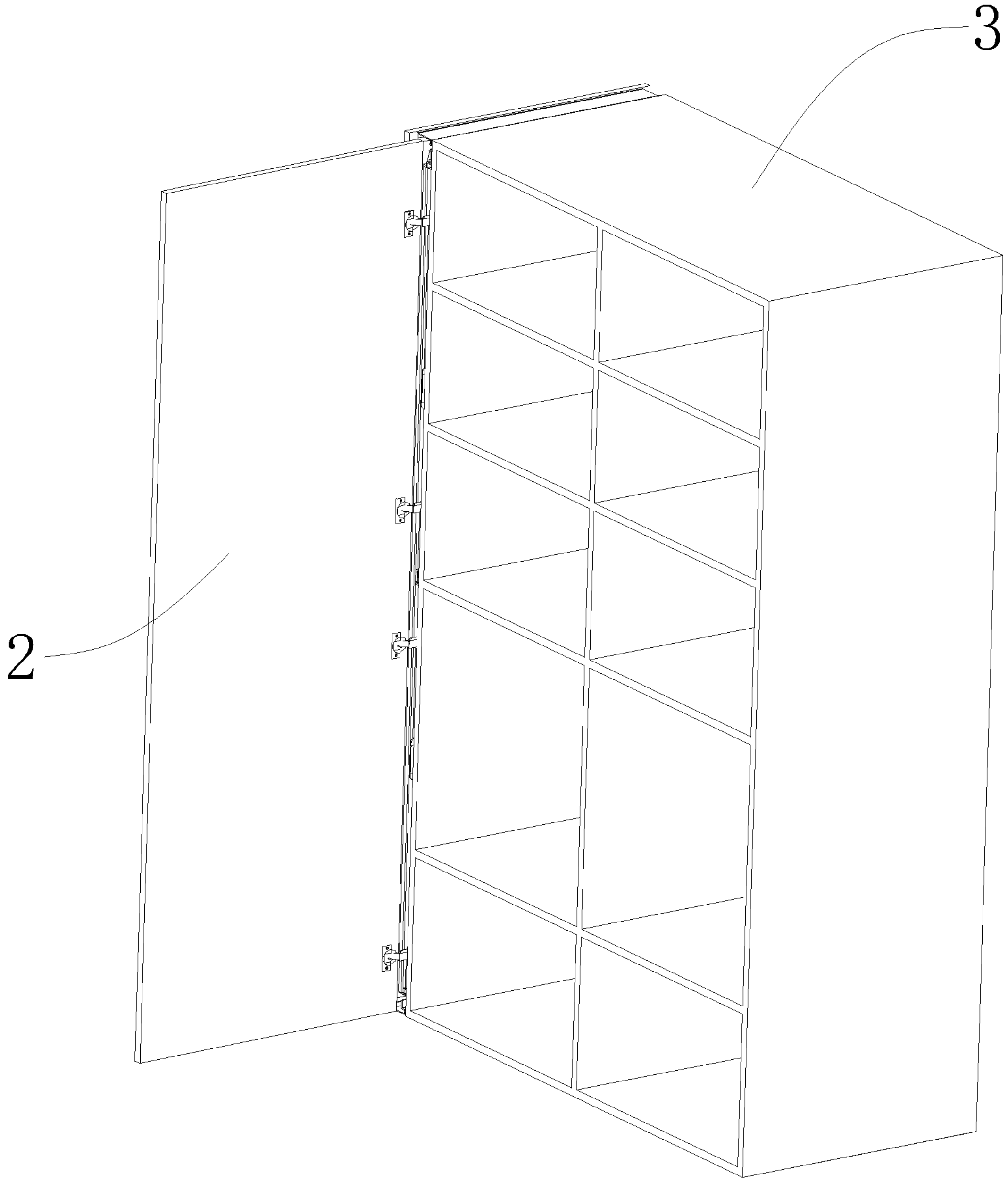
FIG. 8 is a right view of the cabinet body provided by the embodiment 4 of the present invention.
Figure 9:
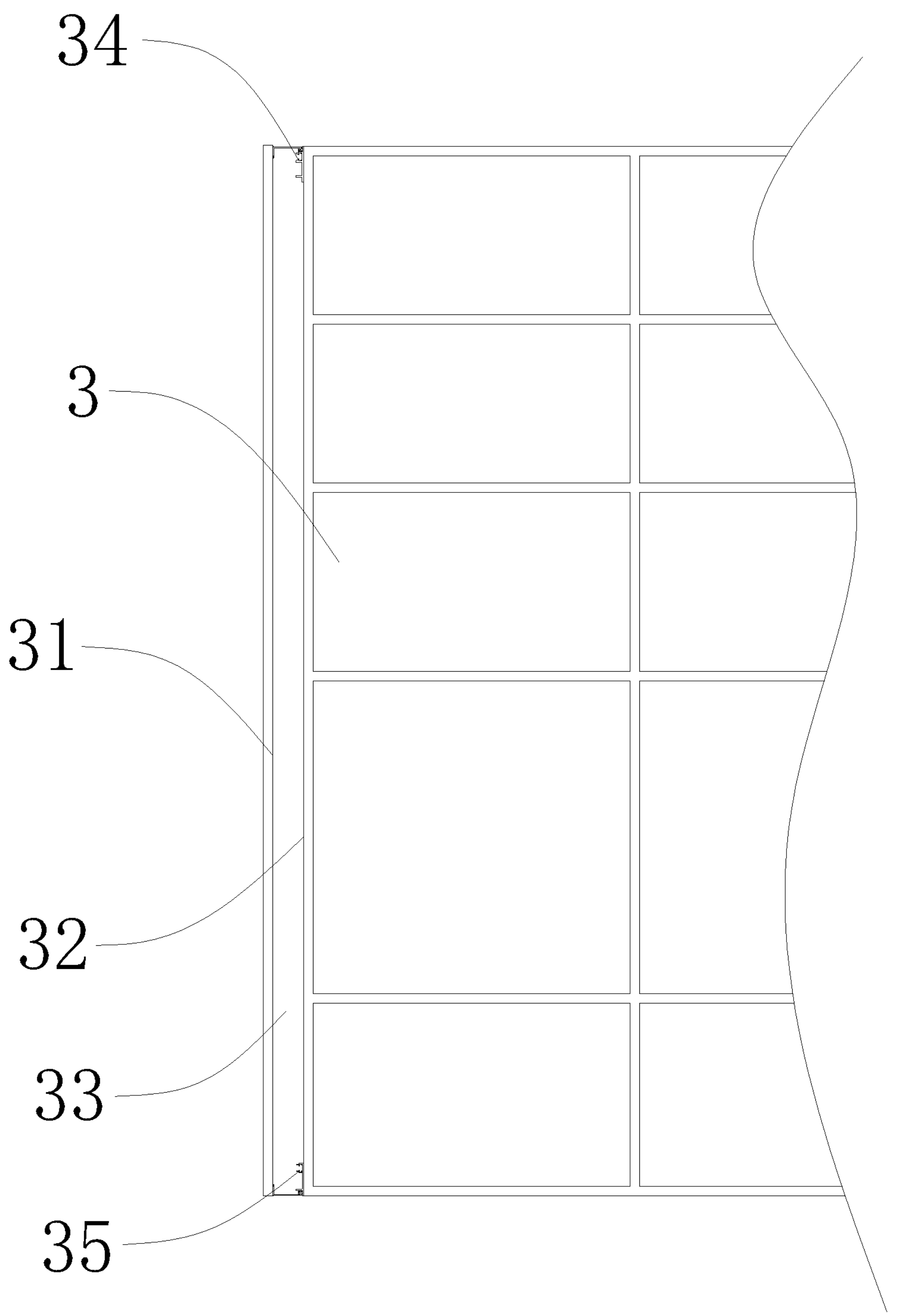
FIG. 9 is a partial view of the cabinet body provided with upper and lower sliding rails provided by the embodiment 4 of the present invention.
Figure 10:
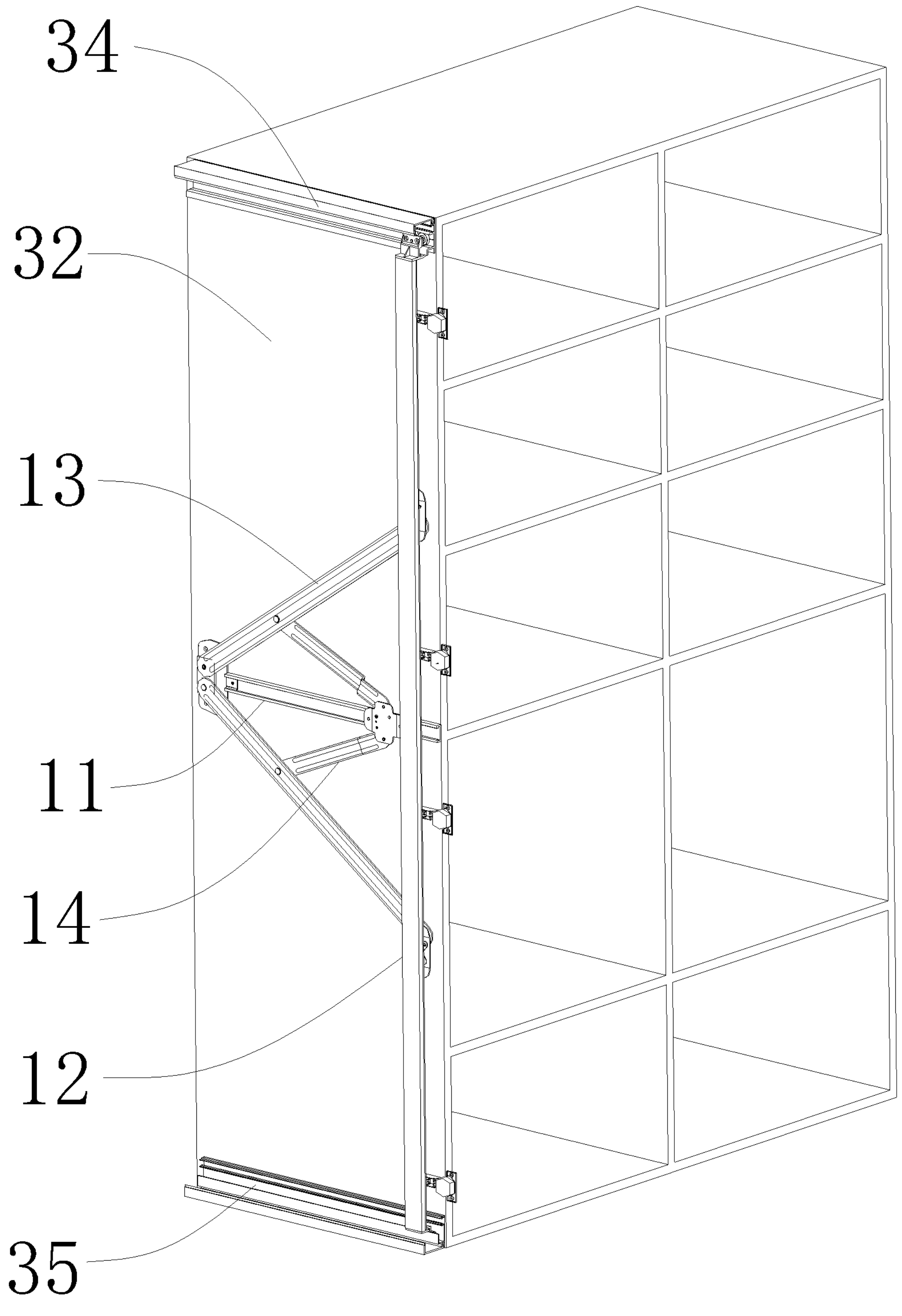
FIG. 10 is a side section view of the cabinet body provided by the embodiment 4 of the present invention.

As shown in FIG. 5 and FIG. 6, the present invention further discloses a side hidden door system 2, which is provided with a door plate 21 and the synchronous sliding mechanism 1 as described in the embodiment 2. Specifically, the guide rail 12 is provided with a hinged piece, and the door plate 21 is hinged with the guide rail 12. The door plate 21 is opened and closed through the hinged piece. Meanwhile, when the door plate 21 is parallel with the guide rail 12, by pushing and pulling the door plate 21, the expansion and retraction of the door plate 21 may be realized through the expansion and retraction of the synchronous sliding mechanism 1. The telescopic door is widely applied and can obviously reduce the space occupied by the door body.

Embodiment 4

As shown in FIG. 7, FIG. 8, FIG. 9 and FIG. 10, the present invention further discloses a cabinet body, including the side hidden door system 2 as described in the embodiment 3. In the embodiment, the cabinet body 3 comprises a built-in plate 32, wherein an accommodating cavity 33 is formed between the built-in plate 32 and a side panel 31 closer to the built-in plate 32, the fixed base 134 of the synchronous sliding mechanism 1 is fixed on the built-in plate 32, an upper sliding rail 34 and a lower sliding rail 35 are provided at an upper end and a lower end of the accommodating cavity 33 respectively, sliding pieces corresponding to the upper sliding rail 34 and the lower sliding rail 35 are provided at two ends of the guide rail 12, and the guide rail 12 is slidingly connected with the upper sliding rail and the lower sliding rail through the sliding pieces at the two ends. When the door plate 21 is parallel with the guide rail 12, the door plate 21 is pushed and pulled, the door plate 21 slides stably on the upper sliding rail 34 and the lower sliding rail 35 of the accommodating cavity 33 through the sliding pieces at the two ends of the guide rail 12, and the door plate 21 retracts through the synchronous sliding mechanism 1.

In the embodiment, the synchronous sliding mechanism may be widely applied in the field of household furnishing. The door body may be opened and stored hidden through the synchronous sliding mechanism, so that the space requirement of the opened door body is reduced. The synchronous sliding mechanism has a simple structure and ensures the stable operation of the side hidden door in the opening process of the side hidden door, and the door body is not prone to shaking.

The technical means disclosed by the solutions of the present invention are not limited to the technical means disclosed in the above implementation manners, and technical solutions formed by any combination of the above technical features are further included. It should be noted that those of ordinary skilled in the art may further make some improvements and modifications without departing from the principle of the present invention, and the improvements and modifications should also be considered to fall within the protection scope of the present invention.

The invention claimed is:

1. A synchronous sliding mechanism (1) for a movement guide of a side door, characterized in that, comprising: a guide rail (12), a first connecting rod mechanism (13), and a second connecting rod mechanism (14), wherein:

the first connecting rod mechanism (13) comprises a fixed base (134), a first connecting rod (131) and a second connecting rod (132); ends of the first connecting rod (131) and the second connecting rod (132) on a same side are pivotally connected to the fixed base (134); the first connecting rod (131) and the second connecting rod (132) are located on two sides of a horizontal central axis of the fixed base (134); and two sliding ends (133) on the guide rail (12) are provided on other ends of the first connecting rod (131) and the second connecting rod (132) respectively, and when the guide rail (12) reciprocates in a horizontal axial direction, the two sliding ends (133) are close to or far away from each other;

the second connecting rod mechanism (14) comprises a sliding base (141), and a third connecting rod (143) and a fourth connecting rod (144) symmetrically provided in the horizontal central axial direction of the fixed base (134); the sliding base (141) and the fixed base (134) are located on a same side of the guide rail (12); and ends of the third connecting rod (143) and the fourth connecting rod (144) on a same side are pivotally connected to the sliding base (141), and other ends are pivotally connected to the first connecting rod (131) and the second connecting rod (132) respectively;

the synchronous sliding mechanism (1) further comprises a horizontal shaft (11), wherein one end of the horizontal shaft (11) is fixed on the fixed base (134), and the sliding base (141) slides with respect to another end of the horizontal shaft (11).

2. The synchronous sliding mechanism (1) according to claim 1, characterized in that the first connecting rod (131) and the second connecting rod (132) are symmetrical in a horizontal central axial direction of the fixed base (134).

3. The synchronous sliding mechanism (1) according to claim 2, characterized in that the first connecting rod (131) and the second connecting rod (132) are pivotally connected to the fixed base (134) through a same pivotal connection piece.

4. The synchronous sliding mechanism (1) according to claim 2, characterized in that the first connecting rod (131) and the second connecting rod (132) are pivotally connected to the fixed base (134) respectively.

5. The synchronous sliding mechanism (1) according to claim 1, characterized in that the horizontal shaft (11) is provided with a sliding groove (111); the sliding base (141) is provided with a sliding piece; and the sliding base (141) slides in the sliding groove (111) of the horizontal shaft (11).

6. The synchronous sliding mechanism (1) according to claim 5, characterized in that the third connecting rod (143) and the fourth connecting rod (144) are respectively provided with bending portions (142), and the bending portions (142) enable respective rod bodies of the third connecting rod (143) and the fourth connecting rod (144) to be positioned in different planes in a depth direction.

7. The synchronous sliding mechanism (1) according to claim 6, characterized in that the bending portions (142) divide the respective rod bodies of the third connecting rod (143) and the fourth connecting rod (144) into front rod portions (145) and rear rod portions (146); the front rod portions (145) of the third connecting rod (143) and the fourth connecting rod (144) are pivotally connected to the first connecting rod (131) and the second connecting rod (132) respectively; the rear rod portions (146) of the third connecting rod (143) and the fourth connecting rod (144) are pivotally connected to the sliding base (141) respectively; and the front rod portions (145) are located on inner sides of the rear rod portions (146) in the depth direction.

8. The synchronous sliding mechanism (1) according to claim 7, characterized in that the front rod portions (145) and the rear rod portions (146) are parallel with each other.

9. A slide hidden door system (2), characterized by comprising a door plate (21) and the synchronous sliding mechanism (1) of claim 1, wherein the door plate (21) is hinged to the guide rail (12).

10. A cabinet body (3), characterized by comprising the side hidden door system (2) of claim 9, wherein the synchronous sliding mechanism (1) is provided on a side of the cabinet body (3).

11. The cabinet body (3) according to claim 10, characterized in that the cabinet body (3) comprises a side panel (31), the fixed base (134) of the synchronous sliding mechanism (1) is fixed on the side panel (31), and the synchronous sliding mechanism (1) is located in the cabinet body (3).

12. The cabinet body (3) according to claim 10, characterized in that the cabinet body (3) comprises a built-in plate (32), an accommodating cavity (33) is formed between the built-in plate (32) and a side panel (31) closer to the built-in plate (32), and the synchronous sliding mechanism (1) is located in the accommodating cavity (33).

13. The cabinet body (3) according to claim 12, characterized in that the fixed base (134) of the synchronous sliding mechanism (1) is fixed on the side panel (31).

14. The cabinet body (3) according to claim 12, characterized in that the fixed base (134) of the synchronous sliding mechanism (1) is fixed on the built-in plate (32).

15. The cabinet body (3) according to claim 11, characterized in that upper and lower sliding rails are provided in the cabinet body (3), sliding pieces are provided at two ends of the guide rail (12), and the guide rail (12) is slidingly connected with upper and lower sliding rails through the sliding pieces at the two ends.

16. The cabinet body (3) according to claim 12, characterized in that upper and lower sliding rails are provided in the cabinet body (3), sliding pieces are provided at two ends of the guide rail (12), and the guide rail (12) is slidingly connected with upper and lower sliding rails through the sliding pieces at the two ends.

* * * * *